United States Patent
Mehta et al.

(10) Patent No.: US 9,184,986 B2
(45) Date of Patent: Nov. 10, 2015

(54) METHOD AND APPARATUS FOR OPTIMIZING AND SCALING CONTROL PLANE TRAFFIC IN CARRIER ETHERNET TRANSPORT NETWORKS

(71) Applicant: Indian Institute of Technology, Mumbai (IN)

(72) Inventors: Saurabh Mehta, Mumbai (IN); Ashwin Gumaste, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 495 days.

(21) Appl. No.: 13/631,682

(22) Filed: Sep. 28, 2012

(65) Prior Publication Data

US 2014/0016453 A1 Jan. 16, 2014

(30) Foreign Application Priority Data

Jul. 10, 2012 (IN) .......................... 1993/MUM/2012

(51) Int. Cl.
*H04L 12/24* (2006.01)
*H04L 12/26* (2006.01)

(52) U.S. Cl.
CPC ........ *H04L 41/0654* (2013.01); *H04L 41/0823* (2013.01); *H04L 41/145* (2013.01); *H04L 43/10* (2013.01)

(58) Field of Classification Search
USPC ............... 370/216, 241, 242, 254, 395.5, 401
See application file for complete search history.

(56) References Cited

U.S. PATENT DOCUMENTS

| | | | |
|---|---|---|---|
| 2003/0198180 A1* | 10/2003 | Cambron | 370/216 |
| 2004/0203827 A1* | 10/2004 | Heiner et al. | 455/452.1 |
| 2008/0095045 A1* | 4/2008 | Owens et al. | 370/220 |
| 2008/0112384 A1* | 5/2008 | Seo et al. | 370/343 |
| 2009/0109861 A1* | 4/2009 | Kini et al. | 370/242 |
| 2012/0147883 A1* | 6/2012 | Uttaro et al. | 370/389 |

* cited by examiner

*Primary Examiner* — Brandon Renner
*Assistant Examiner* — Prince A. Mensah (57) ABSTRACT

Methods and apparatuses for merging continuity check messages (CCMs) are described. Some embodiments determine multiplexer and de-multiplexer nodes in a network for multiplexing and de-multiplexing CCM traffic. One embodiment creates an optimization problem which when solved identifies nodes in the network that should be configured as multiplexer nodes to multiplex multiple CCMs into a group CCM and/or as de-multiplexer nodes to de-multiplex a group CCM into multiple CCMs. This embodiment uses the solution of the optimization problem to configure nodes in the network as multiplexer nodes and/or as de-multiplexer nodes. Another embodiment determines weights for different paths in the network that can be used for merging CCM traffic, and then merges the CCM traffic based on these weights.

12 Claims, 8 Drawing Sheets

METHOD AND APPARATUS FOR OPTIMIZING AND SCALING CONTROL PLANE TRAFFIC IN CARRIER ETHERNET TRANSPORT NETWORKS

RELATED APPLICATION

This application claims priority to Indian Patent Application No. 1993/MUM/2012, entitled "Method and apparatus for optimizing and scaling control plane traffic in carrier Ethernet transport networks," by the same inventors, filed 10 Jul. 2012, the contents of which are incorporated by reference herein.

BACKGROUND

1. Technical Field

This disclosure relates to computer networking More specifically, this disclosure relates to methods and apparatus for optimizing and scaling control plane traffic in carrier Ethernet transport networks.

2. Related Art

Carrier Ethernet is being heralded as the next major innovation in transport and is being sought after in both the enterprise and the service provider worlds. Reliability and availability are key requirements for data services in a transport network. Achieving a reliability value of 99.999% and sub-50 ms restoration is critical for seamless operation of networks. Traditionally, SONET/SDH has been successful in meeting these requirements. Carrier Ethernet technologies are expected to dominate much of transport networks in the future. The primary differentiators between best-effort Ethernet transport and Carrier-class Ethernet transport are the evolution of the data-forwarding plane and the control plane that facilitate managed services. The data-plane relies on service level identifiers that facilitate forwarding of frames in a reliable, deterministic, fault-agnostic, service-differentiated manner. The control plane is responsible for setting up these identifiers (e.g., labels in MPLS-TP, tags in PBB-TE, etc.), configuring network elements, providing and provisioning the protection path and detecting failures.

In a SONET/SDH network, synchronization and overhead bytes within a frame along with the DCC (digital control channel) provides a dedicated failure detection mechanism. In contrast, Carrier Ethernet relies on a specific implementation of the ITU.T1731, ITU.T8031 and IEEE 802.1ag Connectivity Fault Management (CFM) standard that facilitates continuous exchange of heartbeat messages (called Connectivity Check Messages or CCMs) that enable a destination node to isolate service failure. The CFM standard provides for creation of Management End-Points (MEPs) at source and destinations for a particular service. These MEPs continuously communicate by sending CCM heartbeat messages from the source to the destination at periodic intervals.

The CCMs are usually generated per service, and when a destination does not receive three consecutive CCMs, the destination determines that a fault has occurred for the service and initiates a protection mechanism. Since CCMs are generated per service, there is a continuous exchange of CCM heartbeat messages across the network for every service provisioned in the network. This potentially leads to heavy traffic and can reduce the efficiency of the network. The problem of such a control plane is that for every active data-service, the control plane uses a separate, in-band control service that sends a continuous flow of CCMs. The amount of data generated by the control plane can create scalability issues at intermediate nodes, which can adversely impact network growth.

To illustrate the significance of the problem of control plane traffic, consider a network over which 1000 services are to be provisioned. If CCMs are generated per service (in compliance with the CFM standard), the total CCM traffic over the entire network will be about 1 Gbps (two bi-directional CCMs of 64 bytes each per service every 10 ms).

SUMMARY

Some embodiments disclosed herein provide methods and apparatuses for optimizing and scaling control plane traffic in carrier Ethernet transport networks.

Some embodiments provide a system to identify multiplexer and de-multiplexer nodes in a network for multiplexing and de-multiplexing CCM traffic. During operation, the system receives a set of services in the network. Next, the system constructs an optimization problem which when solved identifies nodes in the network that should be configured as multiplexer nodes to multiplex multiple CCMs into a group CCM and/or as de-multiplexer nodes to de-multiplex a group CCM into multiple CCMs. The system then solves the optimization problem to obtain a solution. Next, the system configures nodes in the network as multiplexer nodes and/or as de-multiplexer nodes according to the solution.

In some embodiments, the system receives a set of services in the network. Next, the system constructs a tripartite graph H={S, P, D}, wherein set S includes source nodes for services in the network, set D includes destination nodes for services in the network, and set P includes nodes that correspond to different paths that can be used to route services from their respective source nodes to their respective destination nodes, and wherein each node in set P is assigned a weight which is equal to a product of the length of a path that corresponds to the node and a quantity of services whose route shares the path. The system then iteratively performs the following operations until no more services can be merged: (1) select a node in set P such that the node has the highest weight and a path corresponding to the node is shared between at least two or more services that have not been merged; (2) merge CCM traffic of the at least two or more services over the path that corresponds to the selected node in set P; and (3) remove services that were merged from the set of services.

In some embodiments, the network is an Ethernet network, and a CCM is an Ethernet frame that is periodically sent from a source node of a service to a destination node of the service to enable the destination node to detect a failure in the network that impacts the service. In some embodiments, the network is a Multi-Protocol Label Switching (MPLS) or MPLS Transport Profile (MPLS-TP) network, and a CCM is a Multi-Protocol Label Switching (MPLS) or MPLS Transport Profile (MPLS-TP) packet that is periodically sent from a source node of a service to a destination node of the service to enable the destination node to detect a failure in the network that impacts the service. In this disclosure, unless otherwise stated, the term "based on" means "based solely or partly on."

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer Networks

Computer networking is typically accomplished using a layered software architecture, which is often referred to as a networking stack. Each layer is usually associated with a set of protocols which define the rules and conventions for processing packets in that layer. Each lower layer performs a service for the layer immediately above it to help with processing packets. The Open Systems Interconnection (OSI) model defines a seven layered network stack.

At a source node, each layer typically adds a header as the payload moves from higher layers to lower layers through the source node's networking stack. A destination node typically performs the reverse process by processing and removing headers of each layer as the payload moves from the lowest layer to the highest layer at the destination node.

A network can include nodes that are coupled by links in a regular or arbitrary mesh topology. A networking stack may include a link layer (layer 2 in the OSI model) and a network layer (layer 3 in the OSI model). The link layer (e.g., Ethernet) may be designed to communicate packets between nodes that are coupled by a link, and the network layer (e.g., Internet Protocol or IP for short) may be designed to communicate packets between any two nodes within a network.

A device that makes forwarding decisions based on information associated with the link layer is sometimes called a switch. A device that makes forwarding decisions based on information associated with the network layer is sometimes called a router. The terms "switch" and "router" are used in this disclosure interchangeably to refer to a device that is capable of making forwarding decisions based on information associated with the link layer and/or the network layer.

Unless otherwise stated, the term "IP" refers to both "IPv4" and "IPv6" in this disclosure. The use of the term "frame" is not intended to limit the disclosed embodiments to the link layer, and the use of the term "packet" is not intended to limit the disclosed embodiments to the network layer. In this disclosure, terms such as "frame," "packet," "cell," "datagram" etc. are generally intended to refer to a group of bits.

Ethernet Connectivity Fault Management

Ethernet Connectivity Fault Management (CFM) is an end-to-end layer-2 operation, administration, and management (OAM) protocol. It includes proactive connectivity monitoring, fault verification, and fault isolation for large Ethernet MANs and WANs. CFM partitions a network into hierarchical administrative domains called maintenance domains (MDs). A maintenance domain, controlled by a single operator, is a part of a network in which CFM is enabled. A maintenance domain is defined by the set of ports internal to it (called Maintenance Intermediate Points or MIPs) and at its boundary (called Maintenance End Points or MEPs). The CFM messages always originate at an MEP and are of the following types—(1) Continuity Check Message (CCM), (2) Loopback Message (LBM) and (3) Link Trace Message (LTM).

Continuity Check protocol is used to detect connectivity failures and unintended connectivity. Once enabled, a MEP sends "heart-beat" CCMs at a periodic interval. MIPs transfer CCMs transparently. Network or service failure is detected when a MEP fails to receive three consecutive CCMs from any one of the MEPs in its maintenance association. If the timer interval is set to between 3.3 ms to 10 ms, the MEP can detect failures and perform protection switching within 50 ms thus emulating SONET/SDH like restoration. The MEP sends CCMs with the Remote Detection (RDI) bit set after detecting loss of a CCM from the corresponding MEP. Upon receiving the first CCM with RDI bit set, the peer MEP detects the RDI condition and switches to the protection path. When the defect condition clears, the MEP sends CCMs with the RDI bit cleared. This allows the administrator to inspect a MEP and determine if there is any defect in this maintenance association.

A loopback protocol is used to verify and isolate connectivity faults. It emulates ping protocol at layer-2. The administrator triggers an MEP to send loopback message (LBM) targeted to the destination of the corresponding service. If the MEP does not receive a valid loopback reply (LBR) corresponding to the LBM, the administrator is aware that a connectivity fault exists. The receiving MEP generates a loopback reply (LBR) towards the originating MEP on receiving a LBM. An MEP can generate multiple LBMs at the same time—differentiating the corresponding LBRs on the basis of a transaction identifier embedded in the loopback frames.

Link-trace protocol is used to perform path discovery and fault isolation in a network. It emulates a trace-route protocol at layer-2. An LTM generated at a MEP traverses the MIPs in the path to reach the terminating MIP/MEP at the destination of the provisioned service. The LTM traverses the network until it reaches a MEP at an equal or higher MD level or a MIP at an equal maintenance domain level. A MEP at a higher MD level discards the LTM. The MEP at an equal MD level responds by sending back link-trace replies (LTRs). If an MIP is not the terminating end-point, it forwards LTMs as well as replies to them. By tracing the replies of the MIPs/MEPs in the path to the destination, the operator can isolate the link where the fault has occurred.

As Carrier Ethernet networks rely on the control plane to facilitate guaranteed delivery and QoS as expected by carrier class services, the scalability of the control plane is certainly an issue. This issue is more pronounced due to the presence of an in-band control plane in Carrier Ethernet. Due to the in-band nature of the control plane, the control and data traffic is statistically multiplexed in Carrier Ethernet. This is unlike SONET/SDH, which has a clean demarcation between the control and data traffic. To make matters worse, the robustness and integrity of the control plane needs to be protected.

More specifically, the control plane traffic needs to follow data-plane traffic link-by-link for the entire path. At the same time, the data plane and control plane need to be decoupled to facilitate a robust network.

Current control plane standards for Carrier Ethernet do not mention the issue of control plane scalability. This issue of scalability is left open for implementation. In fact, current control plane standards require laborious multiplication of the control plane instances, similar to what one would do while creating services in the data plane.

Optimizing and Scaling Control Plane Traffic

Continuity check messages contribute towards the major portion of control traffic within the network. Some embodiments described herein reduce the control plane traffic resulting from CCMs as follows. Instead of generating CCMs per service or merging them on an end-to-end basis, some embodiments described herein merge the CCMs at multiple intermediate points within the network.

Specifically, some embodiments described herein use two types of nodes in the network: multiplexing nodes and de-multiplexing nodes. Multiplexing nodes are responsible for collecting the CCMs received during one time interval from different MEPs and generating a single group CCM (called G-CCM) that indicates the status of all the individual CCMs that have been merged at that node. A status field in the G-CCM indicates those MEPs that have sent the CCM in the previous time interval. All CCMs that traverse a certain shared segment are candidates for being merged. The de-multiplexing nodes create multiple individual CCMs from the G-CCM received based on the status field. A CCM is generated only for those end-points for which the status field in the G-CCM indicates that a CCM has been received in the previous time-slot.

Figure 1A:
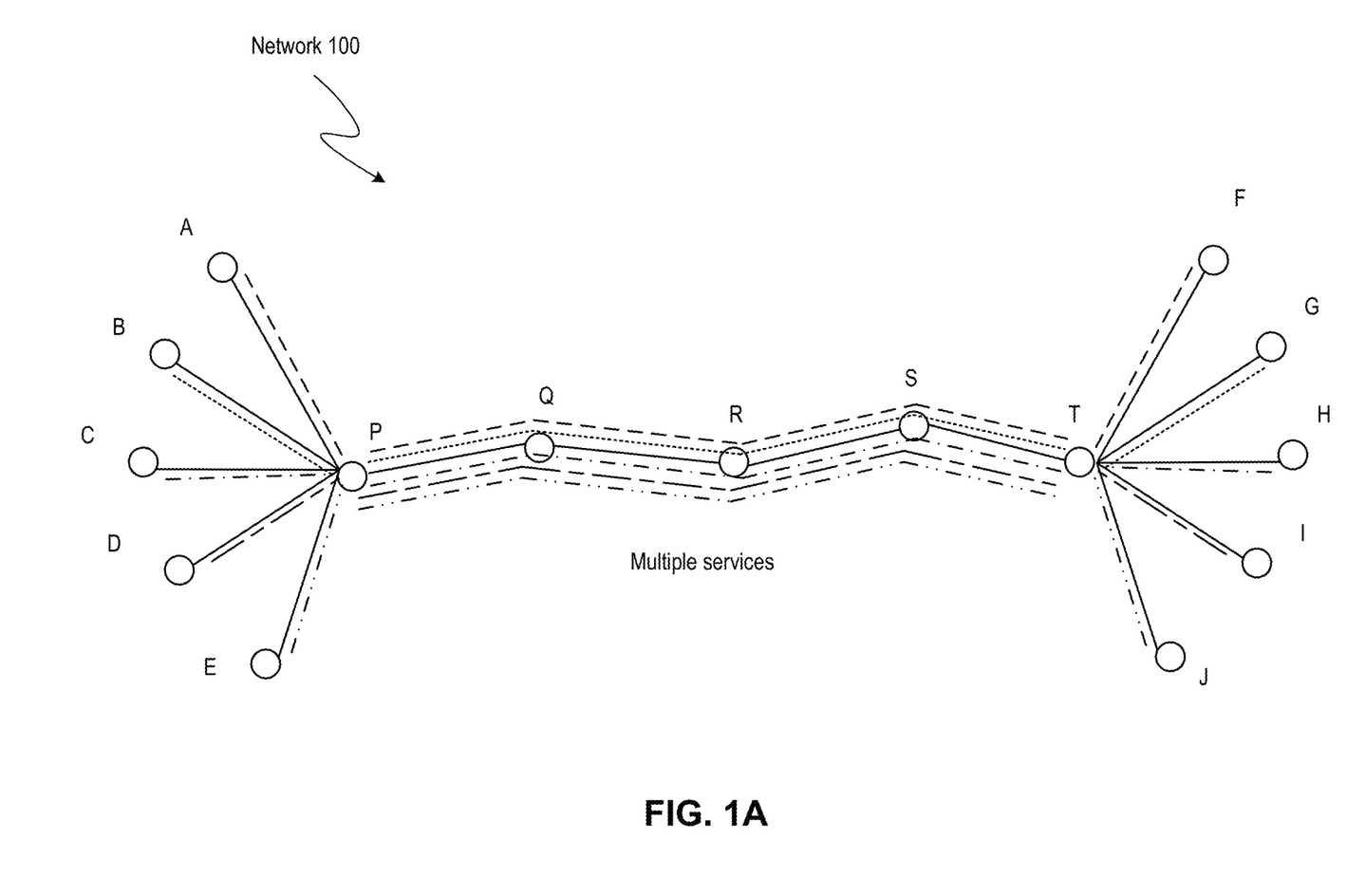
FIGS. 1A-1B illustrate how CCMs can be merged in accordance with some embodiments described herein.
Figure 1B:
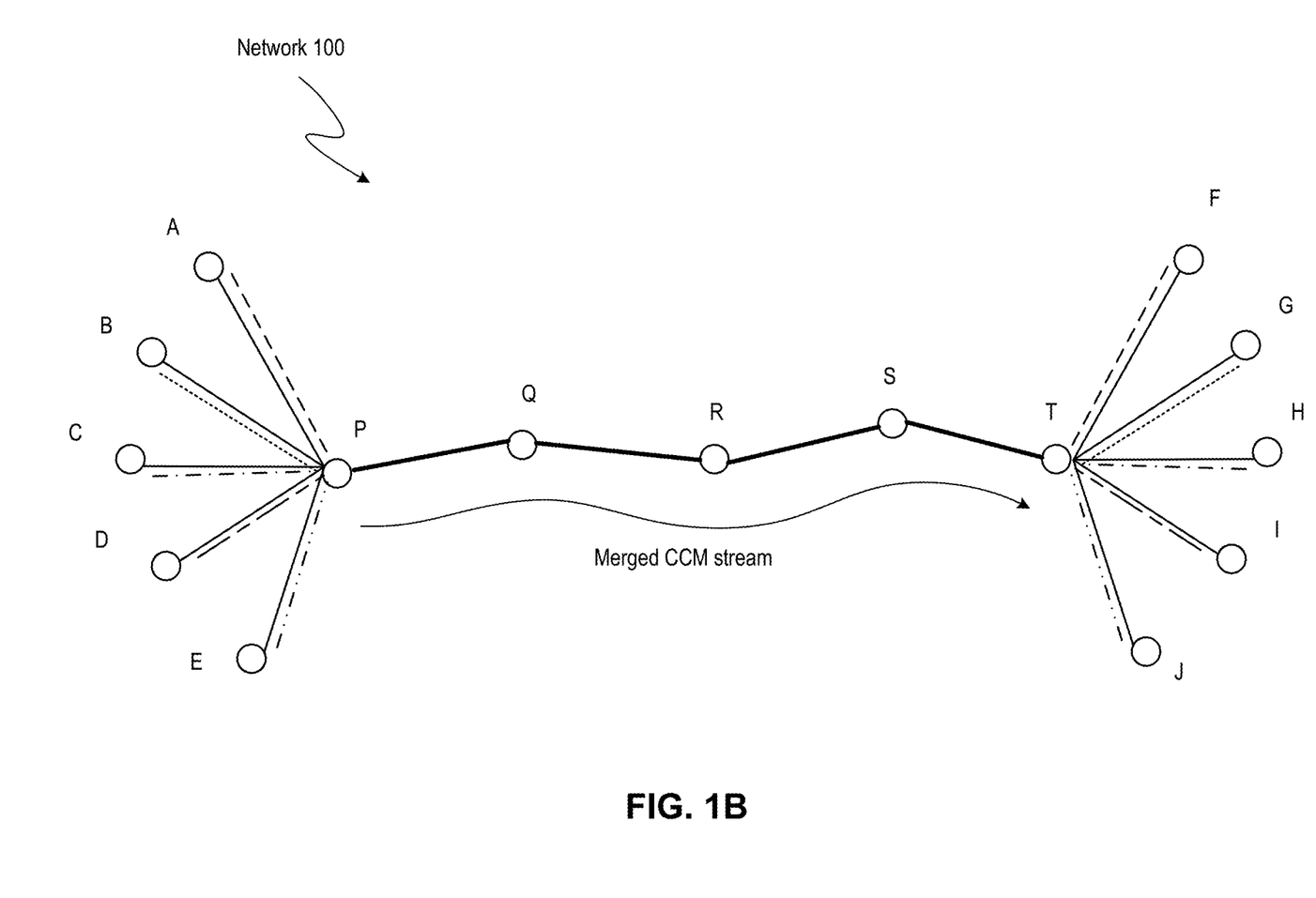

FIGS. 1A-1B illustrate how CCMs can be merged in accordance with some embodiments described herein.

Network 100 includes nodes A-J. As shown in FIG. 1A, services between the following node pairs have been setup in the network: A-F, B-G, C-H, D-I, and E-J. Each of these services shares the following common sub-path: P-Q-R-S-T. If the CCM traffic is not merged, then CCMs are sent for each of these services separately. Some embodiments described herein merge the CCM traffic that traverses a common sub-path. For example, as shown in FIG. 1B, the CCM traffic is merged over common sub-path P-Q-R-S-T. Node P multiplexes CCMs received from nodes A-E into a group CCM and sends the group CCM to node T, which then de-multiplexes the group CCM and sends individual CCMs to nodes F-J. Likewise, in the other direction, node T multiplexes CCMs received from nodes F-J into a group CCM and sends the group CCM to node P, which then de-multiplexes the group CCM and sends individual CCMs to nodes A-E. Some embodiments described herein determine the nodes in the network where CCMs are multiplexed and de-multiplexed so as to minimize the amount of bandwidth that is used by CCM traffic.

Figure 2:
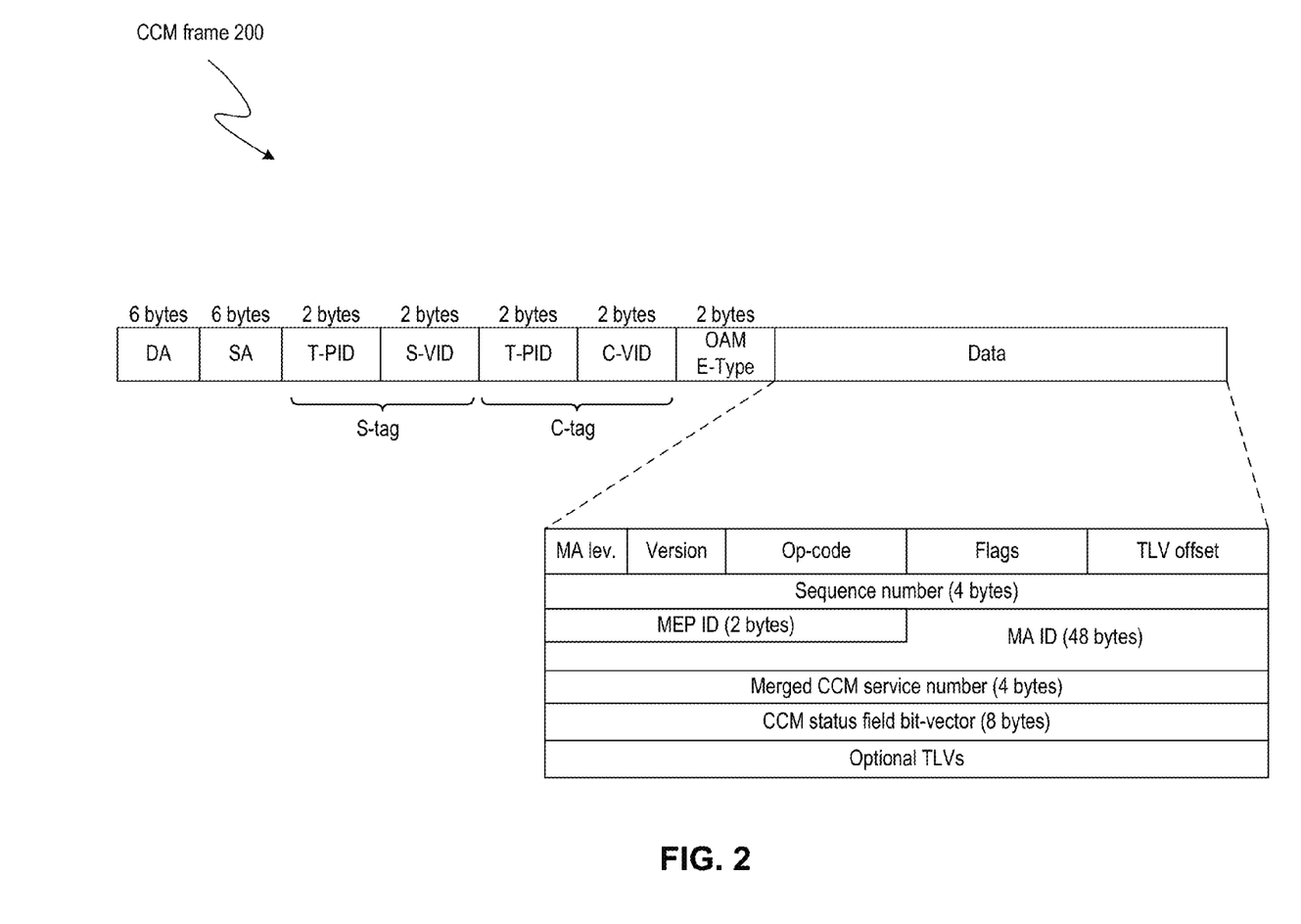
FIG. 2 illustrates a CCM frame in accordance with some embodiments described herein.

FIG. 2 illustrates a CCM frame in accordance with some embodiments described herein.

CCM frame 200 conforms to standard ITU-T 1731. Fields "DA" and "SA" are the destination and source addresses, respectively. The S-tag field comprises a tag protocol identifier (T-PID) and a service-provider virtual local area network identifier (S-VID). The C-tag comprises a tag protocol identifier (T-PID) and a customer virtual local area network identifier (C-VID). The Ethernet type (E-Type) field is set to a value (shown as "OAM E-Type" in FIG. 2) that indicates that the Ethernet frame for operations, administration, and management (OAM) purposes.

The data portion in the frame carries the group CCM information. The fields in the data portion are as follows. "MA level" indicates the administrative domain. "Version" can indicate the protocol version. "Op-code" indicates the type of information contained in the data, e.g., OAM message type, continuity check, loopback, etc. "Flags" is an 8-bit field whose use depends on the type of OAM message. "TLV offset" is a 1-byte field that contains the position of the first type-length-value (TLV) encoded field in CCM frame 200 relative to the TLV offset field. "Sequence number" holds a 4-byte sequence number that is assigned to this frame. "MEP ID" contains the identifier for the MEP that originated CCM frame 200. "MA ID" contains a 48-byte identifier for the administrative domain. "Merged CCM service number" contains a 4-byte value that indicates how many CCM services have been merged in CCM frame 200. "CCM status field bit-vector" is an 8-byte field (i.e., 64-bit vector) that specifies the status for each one of the merged CCM services. "Optional TLVs" are additional TLVs that can be added to the frame to carry other data.

Each multiplexer node maintains a list of the services that are merged at the multiplexer node. Each de-multiplexer maintains a list of the services that are unmerged at the de-multiplexer. The multiplexer and de-multiplexer nodes also maintain a bit-vector (i.e., "CCM status field bit-vector" shown in FIG. 2), where each bit in the bit-vector indicates whether a CCM frame was received for that corresponding service in the last CCM time-slot. In each unit time period t, the multiplexer generates a single CCM with the bit-vector indicating the status of all its member services. Based on the CCM received from multiplexer, the de-multiplexer generates CCMs for all the services that had sent CCMs to the multiplexer.

Figure 3:
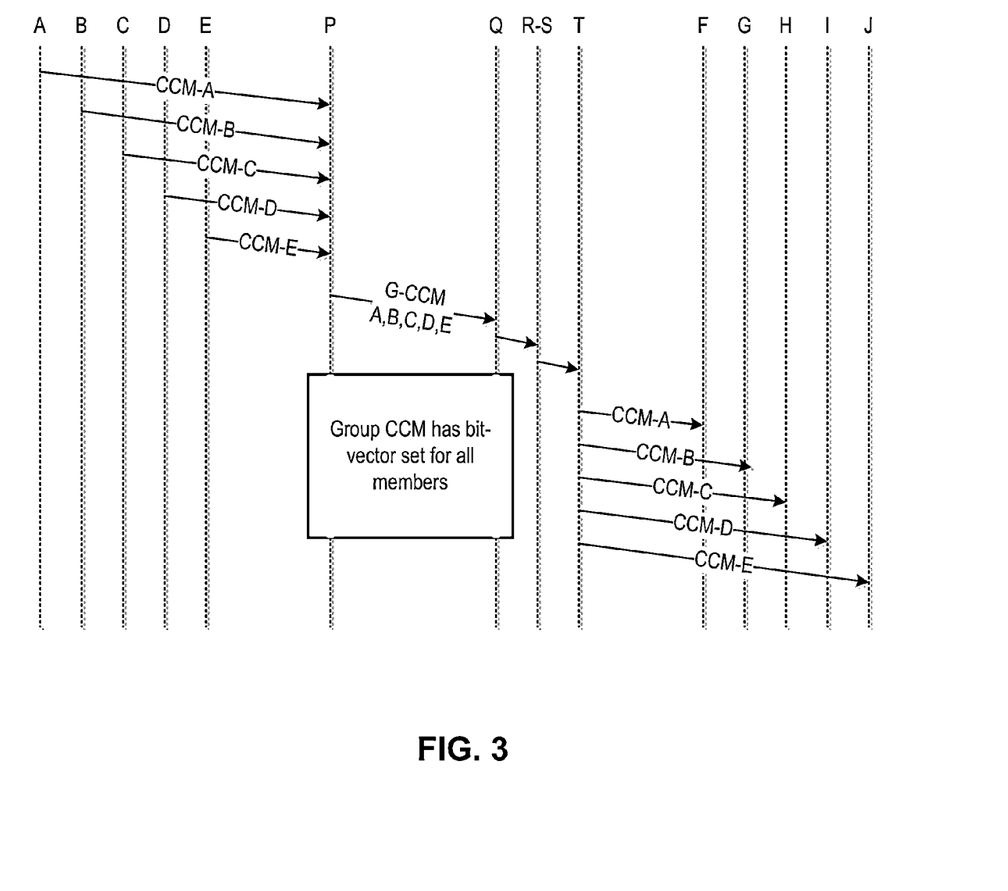
FIG. 3 illustrates a normal CCM stream when no failures occur in the network in accordance with some embodiments described herein.

FIG. 3 illustrates a normal CCM stream when no failures occur in the network in accordance with some embodiments described herein.

As shown in FIG. 3, nodes A-E each send a heartbeat CCM to multiplexing node P in every time slot. Next, multiplexing node P generates a group CCM at the end of the time slot in which all bits in the bit-vector are set to indicate that a CCM was received from nodes A-E. Multiplexing node P then sends the group CCM to de-multiplexing node T via intermediate nodes Q-S. Next, de-multiplexing node T sends individual CCMs to nodes F-J. Since a service has been provisioned between nodes A and F, de-multiplexing node T sends a CCM to node F that appears to have been sent form node A. Likewise the CCMs that are sent to nodes G-J also appear to have been sent from the corresponding nodes in B-E.

Figure 4:
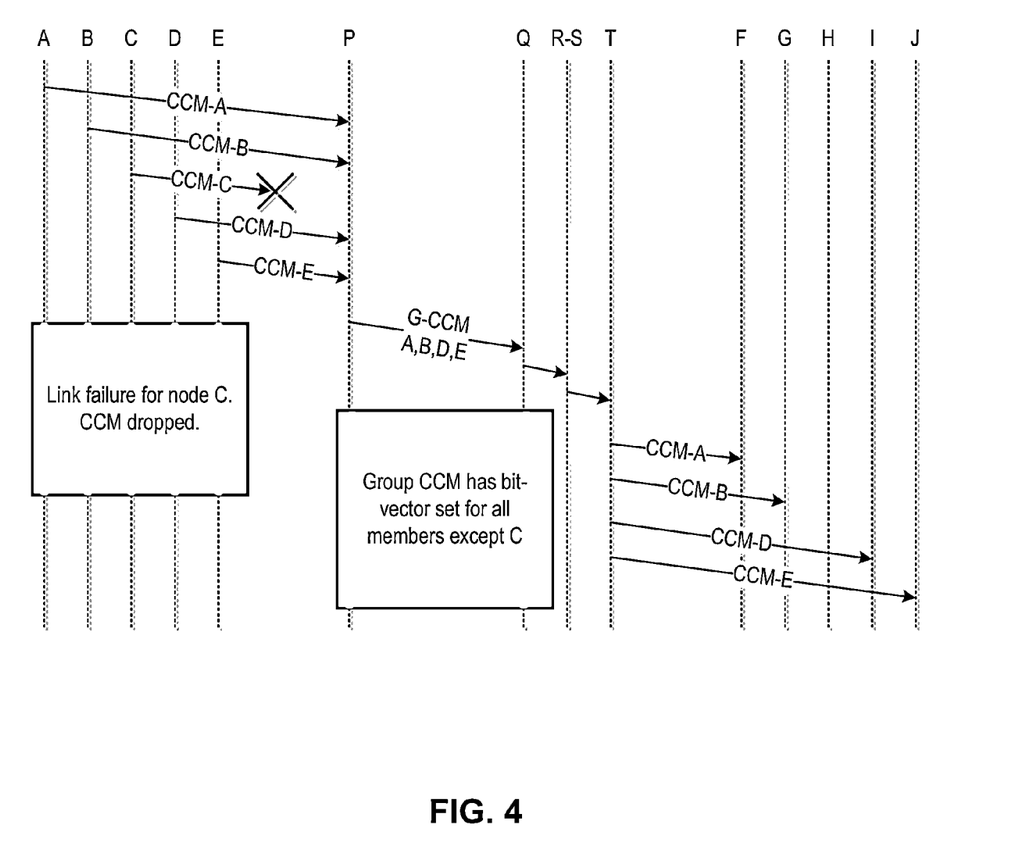
FIG. 4 illustrates a CCM stream when a failure occurs in the network in accordance with some embodiments described herein.

FIG. 4 illustrates a CCM stream when a failure occurs in the network in accordance with some embodiments described herein.

As shown in FIG. 3, nodes A-E each send a CCM to multiplexing node P. However, due to a failure in the link between nodes C and P, the CCM from node C is not received at node P. Next, multiplexing node P generates a group CCM in which all bits in the bit-vector except the bit that corresponds to node C are set to indicate that a CCM was received. Multiplexing node P then sends the group CCM to de-multiplexing node T via intermediate nodes Q-S. Next, de-multiplexing node T sends individual CCMs to nodes F-J. Since the bit corresponding to node C is not set, node T does not send a CCM to node H. After node H fails to receive three consecutive CCMs from node C, node H initiates a protection mechanism for the service that was provisioned between nodes C and H.

Figure 5:
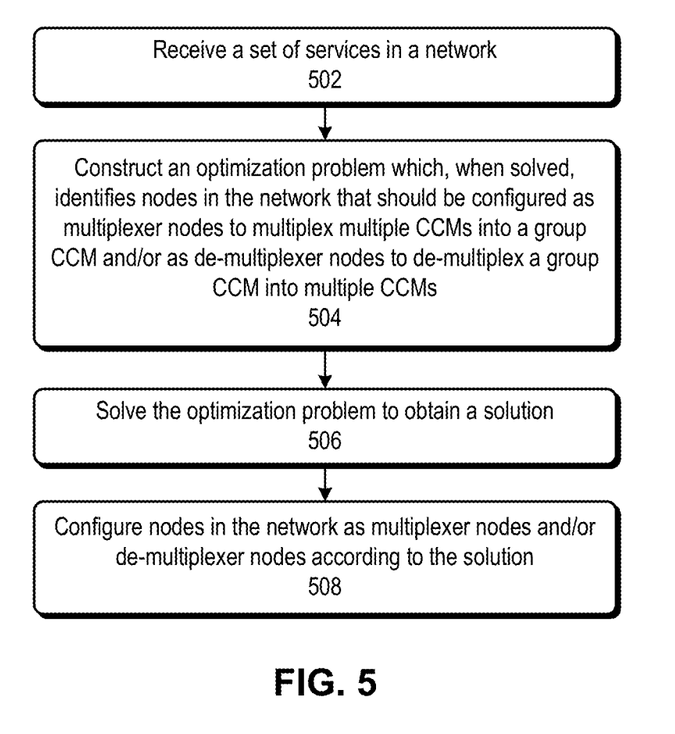
FIG. 5 illustrates a process for selecting nodes in the network to be multiplexer and de-multiplexer nodes in accordance with some embodiments described herein.

FIG. 5 illustrates a process for selecting nodes in the network to be multiplexer and de-multiplexer nodes in accordance with some embodiments described herein.

The process begins by receiving a set of services in the network (operation 502). Next, an optimization problem is constructed which when solved identifies nodes in the network that should be configured as multiplexer nodes to multiplex multiple CCMs into a group CCM and/or as de-multiplexer nodes to de-multiplex a group CCM into multiple CCMs (operation 504). The optimization problem is then solved to obtain a solution (operation 506). Next, nodes in the network are configured as multiplexer nodes and/or as de-multiplexer nodes according to the solution (operation 508).

The following paragraphs illustrate one embodiment for constructing an optimization problem. First, the variables that are used in the problem formulation are described, and then the objective function and the constraints are described. Many variations and modifications to will be apparent to those skilled in the art. For example, a different set of variables, objective functions, and constraints can be used to represent the same optimization problem. In the embodiment described below, the objective function minimizes the amount of control plane traffic in the network. It will be apparent to those skilled in the art that a different objective function can be used if a different metric is desired to be optimized.

A service is uniquely identified by a 3-tuple: source node (si), destination node (di) and the path in the network over which the service is routed (j). Multiple services between si and di on path j are not distinguished. Instead, these services are considered as a single service as far as CCMs are concerned. Binary variable $\alpha_{s_i d_i}^j$ is defined as follows:

$$\alpha_{s_i d_i}^j = \begin{cases} 1, & \text{if there exists a service between nodes } s_i \text{ and } d_i \text{ on path } j \\ 0, & \text{otherwise.} \end{cases}$$

Variable $P_{ab}^j = \{a, \ldots, b\}$ denotes the ordered list of vertices encountered on path j from node a to node b. The number of vertices encountered on path $P_{ab}^j$ is denoted as $|P_{ab}^j|$. Therefore, the total number of CCMs that are sent across links of the network in a heartbeat time period t is $\Sigma_{s_i, d_i, j} \alpha_{s_i d_i}^j (|P_{s_i d_i}^j| - 1)$.

Note that the multiplexing and de-multiplexing of CCMs at intermediate node(s) significantly reduces the overall CCM traffic in the network. Binary variable $\beta_{ab}^{s_i d_i j}$ is defined as follows:

$$\beta_{ab}^{s_i d_i j} = \begin{cases} 1, & \text{if service from } s_i \text{ to } d_i \text{ on path } j \text{ is multiplexed at node } a \text{ and demultiplexed at node } b \\ 0, & \text{otherwise.} \end{cases}$$

Specifically, if $\forall s_i, d_i, j$, if $\beta_{ab}^{s_i d_i j} = 1$, then the CCMs of all these services are multiplexed into a single G-CCM at node a and are de-multiplexed at node b, leading to a saving in the CCM traffic across path $P_{ab}^j$ during a heartbeat time period t of $\Sigma_{a,b,s_i,d_i,j} \beta_{ab}^{s_i d_i j} (|P_{ab}^j| - 1) - (|P_{ab}^j| - 1)$. Note that this relationship represents a multi-commodity flow model. The motivation behind this relationship is that multiplexing CCM traffic of n services saves (n−1) CCMs over each hop of the multiplexed segment.

The objective function can be defined as follows:

$$\min \left[ \sum_{s_i, d_i, j} \alpha_{s_i d_i}^j (|P_{s_i d_i}^j| - 1) - \left( \sum_{a,b,s_i,d_i,j} \beta_{ab}^{s_i d_i j} (|P_{ab}^j| - 1) - (|P_{ab}^j| - 1) \right) \right].$$

The constraints over which the above object function is minimized are now described. These constraints can be grouped into different types as explained below.

A group of path directionality constraints ensure the following property: for a service i that is provisioned using segment $P_{ab}^j$, node b should be downstream to node a. In other words, the distance between node a and destination $d_i$ must be greater than the distance between node b and destination $d_i$. This constraint can be expressed as follows: $\forall i, j, a, b, |P_{ad_i}^j| > |P_{bd_i}^j|$.

Since nested merging is not allowed in some embodiments described herein, the formulation includes a group of constraints that disallows nested merging. If a service is multiplexed at a and de-multiplexed at b on path j, then the services is not allowed to be multiplexed/de-multiplexed again at another node between a and b. In embodiments where nested merging is allowed, these constraints can be relaxed. The constraints that prevent nested merging can be expressed as follows: $\forall x, y, a, b$: if ($\beta_{ab}^{s_i d_i j} = 1$ AND $\beta_{xy}^{s_i d_i j} = 1$) then $|P_{ad_i}^j| < |P_{yd_i}^j|$ OR $|P_{xd_i}^j| < |P_{bd_i}^j|$.

The maximum services per channel constraints restrict the number of CCMs being multiplexed into a single channel at a particular node to a predetermined limit MAX_CCM (this limit may be based on hardware constraints). These constraints can be expressed as follows: $\forall a, b, \Sigma_{s_i, d_i, j} \beta_{ab}^{s_i d_i j} \leq$ MAX_CCM.

The maximum channel constraints restrict the number of different multiplexed CCM channels that are created at a particular node to a predetermined limit MAX_CHANNELS (this limit may be based on hardware constraints). These constraints can be expressed as follows: $\forall a, b, s_i, d_i, \Sigma_j \beta_{ab}^{s_i d_i j} \leq$ MAX_CHANNELS.

The maximum merging constraints restrict the number of times a service can be multiplexed into a merged CCM stream. The upper limit is defined by a combination of protection switching delay ($t_r$), maximum propagation delay ($t_p$), and the CCM time-interval (t). To support 50 ms recovery time, the number of times a CCM can be multiplexed is given by $$\frac{50 \text{ ms} - t_r - t_p}{t}.$$

Therefore, the maximum merging constraints can be expressed as $$\forall s_i, d_i, j, \sum_{a,b} \beta_{ab}^{s_i d_i j} \leq \frac{50 \text{ ms} - t_r - t_p}{t}.$$

Note that the above optimization problem was defined using integer linear programming. It will be apparent to those skilled in the art that other problem formulation techniques can be used to define the optimization problem. Once optimization problem has been constructed, a solver can be used to generate a solution. For example, the above problem formulation can be provided as input to a general purpose integer linear programming solver. The solution generated by the solver will assign values to binary variables $\beta_{ab}^{s_id_j}$. The values assigned to binary variables $\beta_{ab}^{s_id_j}$ directly specify which nodes are multiplexers, which nodes are de-multiplexers, and how the services in the network are merged/de-merged at these multiplexer/de-multiplexer nodes.

Figure 6:
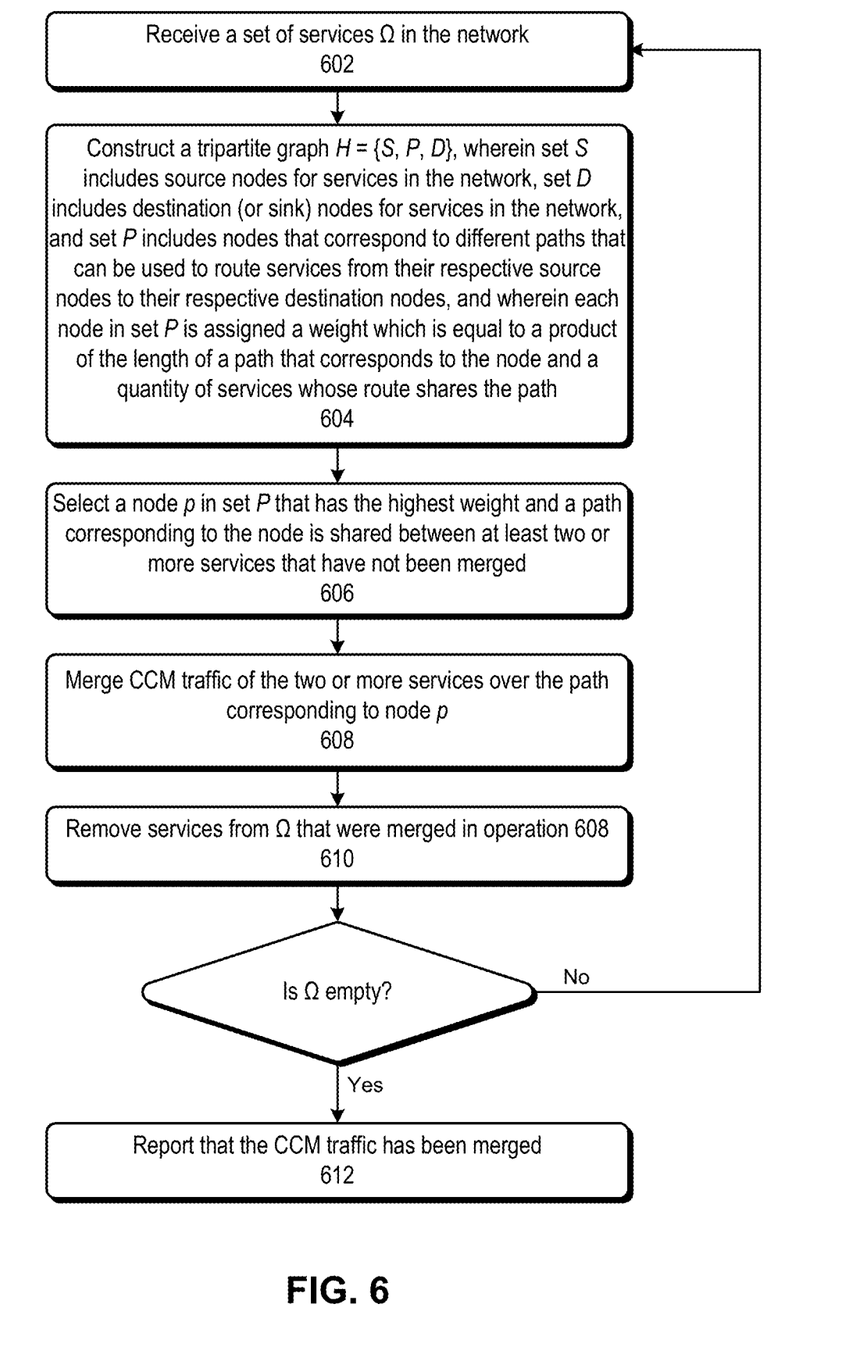
FIG. 6 illustrates another process for selecting nodes in the network to be multiplexer and de-multiplexer nodes in accordance with some embodiments described herein.

FIG. 6 illustrates another process for selecting nodes in the network to be multiplexer and de-multiplexer nodes in accordance with some embodiments described herein.

Each service is assumed to be limited to at most one merging/unmerging instance along its path. Based on the network graph, an auxiliary tripartite graph H={S, P, D} is constructed. The three disjoint set of nodes S, P, and D are defined as follows: $S=\{s_i, \forall i\}$ the set of source node of all the services provisioned over the network, $P=\{p_{ij}, \forall i,j\}$ the set of all possible paths in the network that can be used to route a service, $D=\{d_i, \forall i\}$ the set of sinks of all the services provisioned in the network. The length of path $p_{ij}$ is denoted by $hopcount_{ij}$, while the number of services which use segment $p_{ij}$ is denoted by $\gamma_{ij}$. The adjacency between the nodes is as follows. A node $s_i$ in S is adjacent to node $p_{uv}$ in P if a service that originates at $s_i$ can be routed through path that corresponds to node $p_{uv}$. Likewise, node $d_j$ in D is adjacent to node $p_{uv}$ in P if a service that ends at node $d_j$ can be routed through path that corresponds to node $p_{uv}$.

To quantify the amount of savings incurred by merging services across certain segment(s) along its respective path, a weight metric is associated to each path. Note that the incentive gained by merging traffic along a segment is proportional to the segment length as well as the number of services multiplexed along the corresponding segment. With this motivation, the weight of segment $p_{ij}$ is defined as $w_{ij}=hopcount_{ij}\times\gamma_{ij}$.

The process begins by receiving a set of services in the network (operation 602). Let the set of services be denoted by $\Omega$. Next, a tripartite graph H={S, P, D} is constructed, wherein set S includes source nodes for services in the network, set D includes destination (or sink) nodes for services in the network, and set P includes nodes that correspond to different paths that can be used to route services from their respective source nodes to their respective destination nodes, and wherein each node in set P is assigned a weight which is equal to a product of the length of a path that corresponds to the node and a quantity of services whose route shares the path (operation 604).

The process then selects node $p_{ij}^* \in P$ such that $p_{ij}^*$ has the maximum weight $w_{ij}$ and the number of services incident on $p_{ij}^*$ is greater than 1. In other words, the process selects a node in set P such that the node has the highest weight and the path corresponding to the node is shared between at least two or more services that have not been merged (operation 606).

Next, the process merges CCM traffic that passes through the path from node i to node j in the network that corresponds to node $p_{ij}^*$ (operation 608). In operation 610, the process removes all the services from set $\Omega$ that were merged in operation 608. Finally, if set $\Omega$ is not empty, the process returns to operation 606 and selects the next node in set P. On the other hand, if set fl is empty, the process reports that the CCM traffic has been merged (operation 612).

Figure 7:
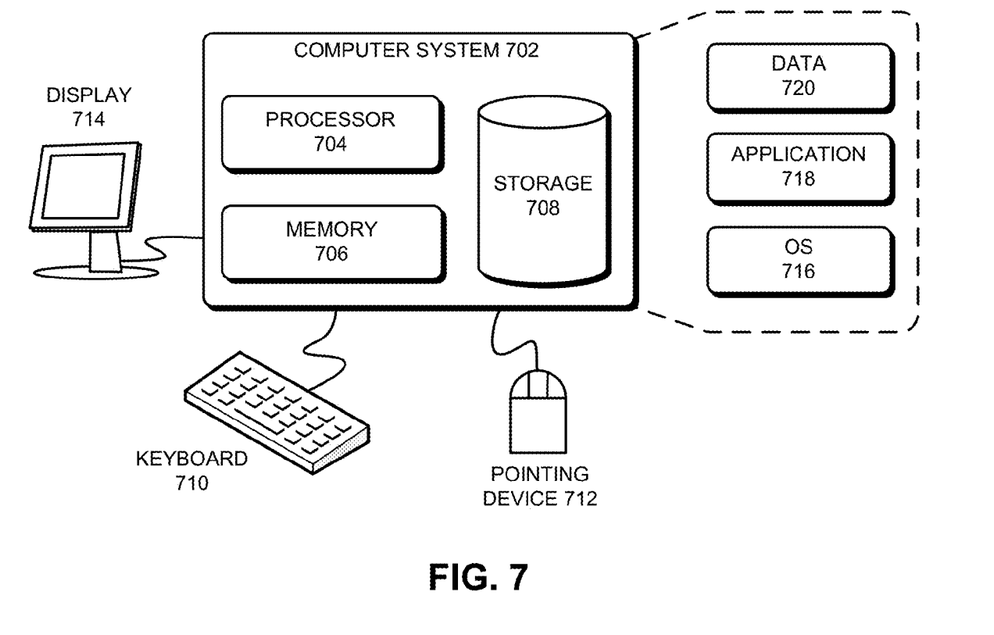
FIG. 7 illustrates a computer system in accordance with some embodiments described in this disclosure.

FIG. 7 illustrates a computer system in accordance with some embodiments described in this disclosure.

A computer system can generally include any device that is capable of performing computations. Specifically, a computer system, such as computer system 702, can include processor 704, memory 706, and storage device 708. Computer system 702 can be coupled to display device 714, keyboard 710, and pointing device 712. Storage device 708 can store operating system 716, application 718, and data 720. Data 720 can include any inputs required by application 718 or any outputs generated by application 718. Application 718 can include network management software.

Computer system 702 may automatically perform any method that is implicitly or explicitly described in this disclosure. Specifically, during operation, computer system 702 can load application 718 into memory 706. When application 718 is executed, it can perform one or more methods that are implicitly or explicitly described in this disclosure. Specifically, in some embodiments, application 718 can merge CCM traffic using one or more methods that are implicitly or explicitly described in this disclosure.

The data structures and code described in this disclosure can be partially or fully stored on a non-transitory computer-readable storage medium and/or a hardware mechanism and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data.

Embodiments described in this disclosure can be implemented in ASICs, FPGAs, dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes. Embodiments described in this disclosure may be implemented using purely optical technologies. The methods and processes described in this disclosure can be partially or fully embodied as code and/or data stored in a computer-readable storage medium or device, so that when a computer system reads and/or executes the code and/or data, the computer system performs the associated methods and processes.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for determining multiplexer and de multiplexer nodes in a network for multiplexing and de multiplexing connectivity check message (CCM) traffic, the method comprising:

receiving a set of services in the network;

constructing an optimization problem which, when solved, identifies nodes in the network that should be configured as multiplexer nodes to multiplex multiple CCMs into a group CCM and/or as de-multiplexer nodes to de-multiplex a group CCM into multiple CCMs wherein said constructing includes:

defining an objective function that minimizes a total amount of CCM traffic that is sent in the network during a predetermined time period, defining constraints to restrict the number of times CCM traffic for a given service is merged to ensure that the service recovers from a failure within a predetermined recovery time, and where said constructing includes defining constraints to prevent nested merging of CCM traffic in the network;

solving, by computer, the optimization problem to obtain a solution; and configuring nodes in the network as multiplexer nodes and/or as de multiplexer nodes according to the solution.

2. The method of claim 1, wherein the network is an Ethernet network, and wherein a CCM is an Ethernet frame that is periodically sent from a source node of a service to a destination node of the service to enable the destination node to detect a failure in the network that impacts the service.

3. The method of claim 1, wherein a CCM is a Multi-Protocol Label Switching (MPLS) or MPLS Transport Profile (MPLS-TP) packet that is periodically sent from a source node of a service to a destination node of the service to enable the destination node to detect a failure in the network that impacts the service.

4. A non-transitory computer-readable storage medium storing instructions that when executed by a computer cause the computer to perform a method for determining multiplexer and de-multiplexer nodes in a network for multiplexing and de-multiplexing connectivity check message (CCM) traffic, the method comprising:
receiving a set of services in the network;
constructing an optimization problem which, when solved, identifies nodes in the network that should be configured as multiplexer nodes to multiplex multiple CCMs into a group CCM and/or as de-multiplexer nodes to de-multiplex a group CCM into multiple CCMs wherein said constructing includes:
defining an objective function that minimizes a total amount of CCM traffic that is sent in the network during a predetermined time period, and
defining constraints to restrict the number of times CCM traffic for a given service is merged to ensure that the service routers from a failure within a predetermined recovery time;
wherein said constructing includes defining constraints to prevent nested merging of CCM traffic in the network;
solving the optimization problem to obtain a solution;
and configuring nodes in the network as multiplexer nodes and/or as de-multiplexer nodes according to the solution.

5. The non-transitory computer-readable storage medium of claim 4, wherein the network is an Ethernet network, and wherein a CCM is an Ethernet frame that is periodically sent from a source node of a service to a destination node of the service to enable the destination node to detect a failure in the network that impacts the service.

6. The non-transitory computer-readable storage medium of claim 4, wherein a CCM is a Multi-Protocol Label Switching (MPLS) or MPLS Transport Profile (MPLS-TP) packet that is periodically sent from a source node of a service to a destination node of the service to enable the destination node to detect a failure in the network that impacts the service.

7. An apparatus, comprising:
a processor;
and a non-transitory processor-readable storage medium storing instructions that are capable of being executed by the processor, the instructions comprising:
instructions for receiving a set of services in the network;
instructions for constructing an optimization problem which, when solved, identifies nodes in the network that should be configured as 8 multiplexer nodes to multiplex multiple CCMs into a group CCM and/or as de-multiplexer nodes to de-multiplex a group CCM into multiple CCMs wherein said constructing includes:
defining an objective function that minimizes a total amount of traffic that is sent in the network during a predetermined time period, and defining constraints to restrict the number of times CCM traffic for a given service is merged to ensure that the service recovers from a failure within a predetermined recovery time;
wherein the instructions for constructing include instructions for defining constraints to prevent nested merging of CCM traffic in the network;
instructions for solving the optimization problem to obtain a solution;
and instructions for configuring nodes in the network as multiplexer nodes and/or as de-multiplexer nodes according to the solution.

8. The apparatus of claim 7, wherein the network is an Ethernet network, and wherein a CCM is an Ethernet frame that is periodically sent from a source node of a service to a destination node of the service to enable the destination node to detect a failure in the network that impacts the service.

9. The apparatus of claim 7, wherein a CCM is a Multi-Protocol Label Switching (MPLS) or MPLS Transport Profile (MPLS-TP) packet that is periodically sent from a source node of a service to a destination node of the service to enable the destination node to detect a failure in the network that impacts the service.

10. A method for determining multiplexer and de-multiplexer nodes in a network for multiplexing and de-multiplexing connectivity check message (CCM) traffic, the method comprising:
receiving a set of services in the network;
constructing a tripartite graph $H = \{S, P, D\}$, wherein set S includes source nodes for services in the network, set D includes destination nodes for services in the network, and set P includes nodes that correspond to different paths that can be used to route services from their respective source nodes to their respective destination nodes, and wherein each node in set P is assigned a weight which is equal to a product of the length of a path that corresponds to the node and a quantity of services whose route shares the path;
and iteratively performing, by computer, the following operations until no more CCMs corresponding to services can be merged:
selecting a node in set P such that the node has the highest weight and a path corresponding to the node is shared between at least two or more CCMs corresponding to services that have not been merged;
merging CCM traffic of the at least two or more CCMs over the path that corresponds to the selected node in set P;
and removing the at least two or more CCMs from a set of CCMs corresponding to services that can be merged.

11. The method of claim 10, wherein the network is an Ethernet network, and wherein a CCM is an Ethernet frame that is periodically sent from a source node of a service to a destination node of the service to enable the destination node to detect a failure in the network that impacts the service.

12. The method of claim 10, wherein a CCM is a Multi-Protocol Label Switching (MPLS) or MPLS Transport Profile (MPLS-TP) packet that is periodically sent from a source node of a service to a destination node of the service to enable the destination node to detect a failure in the network that impacts the service.

* * * * *